(12) United States Patent
Yang et al.

(10) Patent No.: US 9,218,630 B2
(45) Date of Patent: Dec. 22, 2015

(54) IDENTIFYING INFLUENTIAL USERS OF A SOCIAL NETWORKING SERVICE

(75) Inventors: Hung-Chih Yang, Bellevue, WA (US); Danny B. Lange, Sammamish, WA (US); Xiong Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/427,584

(22) Filed: Mar. 22, 2012

(65) Prior Publication Data

US 2013/0254280 A1  Sep. 26, 2013

(51) Int. Cl.
  *G06Q 50/00* (2012.01)
  *G06Q 10/10* (2012.01)
  *G06Q 30/02* (2012.01)
  *G09B 29/00* (2006.01)

(52) U.S. Cl.
  CPC .............. *G06Q 50/01* (2013.01); *G06Q 10/101* (2013.01); *G06Q 30/0201* (2013.01); *G06Q 30/0251* (2013.01); *G06Q 30/0269* (2013.01); *G06Q 30/0271* (2013.01); *G09B 29/00* (2013.01)

(58) Field of Classification Search
  CPC ................................ G06Q 50/01; H04L 51/32
  USPC ......................................................... 709/204
  See application file for complete search history.

(56) References Cited

U.S. PATENT DOCUMENTS

| | | | |
|---|---|---|---|
| 8,543,454 B2 * | 9/2013 | Fleischman et al. ....... | 705/14.44 |
| 8,655,938 B1 * | 2/2014 | Smith et al. ................... | 709/200 |
| 2006/0042483 A1 * | 3/2006 | Work et al. ..................... | 101/91 |
| 2007/0198510 A1 * | 8/2007 | Ebanks .............................. | 707/5 |
| 2012/0215597 A1 * | 8/2012 | Ross .............................. | 705/14.1 |
| 2012/0221559 A1 * | 8/2012 | Kidron .......................... | 707/723 |
| 2012/0226536 A1 * | 9/2012 | Kidron ....................... | 705/14.23 |
| 2013/0006736 A1 * | 1/2013 | Bethke et al. ............. | 705/14.12 |
| 2013/0013678 A1 * | 1/2013 | Murthy ......................... | 709/204 |
| 2013/0014223 A1 * | 1/2013 | Bhatia et al. ...................... | 726/4 |
| 2013/0041860 A1 * | 2/2013 | Lawrence et al. .............. | 706/46 |
| 2013/0054591 A1 * | 2/2013 | Park et al. ..................... | 707/736 |
| 2013/0066706 A1 * | 3/2013 | Wu et al. ..................... | 705/14.42 |
| 2013/0066711 A1 * | 3/2013 | Liyanage et al. .......... | 705/14.43 |
| 2013/0085838 A1 * | 4/2013 | Tennenholtz et al. ...... | 705/14.41 |
| 2013/0097180 A1 * | 4/2013 | Tseng ........................... | 707/748 |
| 2013/0117097 A1 * | 5/2013 | Bachman ................... | 705/14.39 |
| 2013/0117364 A1 * | 5/2013 | Bania et al. ................... | 709/204 |
| 2013/0124626 A1 * | 5/2013 | Cathcart et al. .............. | 709/204 |
| 2013/0151345 A1 * | 6/2013 | Brelig ....................... | 705/14.66 |
| 2013/0151348 A1 * | 6/2013 | Paul et al. ................. | 705/14.66 |
| 2013/0173333 A1 * | 7/2013 | Zhang et al. ................ | 705/7.29 |
| 2013/0173485 A1 * | 7/2013 | Ruiz et al. ..................... | 705/319 |

(Continued)

*Primary Examiner* — Kristie Shingles
(74) *Attorney, Agent, or Firm* — Nicholas Chen; Kate Drakos; Micky Minhas

(57) ABSTRACT

Techniques for identifying influential users of a social networking service are provided. Influential users may be identified via an algorithm in which an influence score is assigned to each user based at least in part on other members of the community users having taken an affirmative step with respect to the user's communications. Iterative processing may be performed, with each user's influence score being determined by contributions from other users, and each contribution being determined by the contributor's influence score as of a prior iteration. A map-reduce framework may be employed, with data representing the community being partitioned into a plurality of discrete shards, a map process corresponding to each shard calculating an influence score for users represented in the shard, and reduce processes ranking users according to influence score across all shards.

20 Claims, 8 Drawing Sheets

(56) References Cited

U.S. PATENT DOCUMENTS

| | | | |
|---|---|---|---|
| 2013/0179440 A1* | 7/2013 | Gordon | 707/731 |
| 2013/0197970 A1* | 8/2013 | Aaskov et al. | 705/7.31 |
| 2013/0212479 A1* | 8/2013 | Willis et al. | 715/736 |
| 2013/0311563 A1* | 11/2013 | Huberman et al. | 709/204 |
| 2014/0089059 A9* | 3/2014 | Vesely et al. | 705/7.39 |

\* cited by examiner

IDENTIFYING INFLUENTIAL USERS OF A SOCIAL NETWORKING SERVICE

BACKGROUND

A social networking service is an on-line service and/or website which enables each user to interact with other users so as to share ideas, activities, interests, etc. Often, social networking services enable a user to construct a representation of his/her persona (e.g., a "wall," profile, "timeline," etc.) that is made visible to some or all of the other users of the service, and that may be employed to communicate reflections, thoughts, interests, etc. Many social networking services also provide a platform through which users may interact, such as via messaging, e-mail, and/or other forms of interaction. Relationships between users of social networking services may be formed and/or fostered through the use of these and other features.

Relationships between social networking service users may take any of numerous forms. As examples, the Twitter social networking service allows one user to "follow" (i.e., receive all of the "tweets" sent by) another user, and the Facebook service enables one user to "friend" (i.e., receive all of the posts made by) another user.

SUMMARY

The inventors have appreciated that an important characteristic of users of social networking services is the influence they wield within the community. Given the popularity of social networking services, and their ability to quickly disseminate information across a large community of users, some constituencies find value in identifying influential users within the community. For example, advertisers may seek to identify influential users, since those users may help shape the opinions of other users with regard to advertised products or services.

The inventors have further appreciated that one indicator of a user's level of influence within a community of users relates to how often ideas expressed by that user are repeated by other users. This is due in part to the nature of relationships between users on many social networking services. On these services, each user has a group of other users with whom he/she has a direct relationship (e.g., the user's "followers" on the Twitter service, "friends" on the Facebook service, etc.). A message (i.e., a "status update," comment, post, tweet, and/or other message) that is sent by a user is typically distributed to that group only, and is not generally distributed to other users of the service. For example, if a Facebook user posts a status update on his/her wall, generally only his/her friends are notified of the update.

However, if a member of the group which receives the message deems the ideas expressed therein worthy of repeating, then that group member may distribute the message to those with whom he/she has a direct relationship, thereby expanding the number of users to whom the first user's message is distributed. The inventors have appreciated that the group member's willingness to take an affirmative step to repeat the user's message, and more generally that a user's propensity for having his/her messages repeated across a larger audience than those to whom those message are initially sent, is indicative of the user's influence within the community. This is because those users may not only have an ability to shape other users' opinions (e.g., about products, services, current events, and/or other things) via the expression of ideas, but those expressions are more likely to be distributed to a larger audience than the ideas expressed by less influential users. Some embodiments of the invention, then, are directed to techniques for identifying influential users within a community of users of a social networking service.

In some embodiments, techniques for identifying influential users may involve performing a process known as "power iteration." Those skilled in the computer programming arts may recognize that power iteration is a known approach to identifying members of a population exhibiting particular characteristics. For example, power iteration techniques are employed by online search engines to determine the order in which pages returned by a search query are to be presented to a user. Embodiments of the invention employ power iteration techniques to identify users of one or more social networks who are influential within the user community.

Owing to the large population of users of some social networking services, some embodiments of the invention may employ a software framework known as "map-reduce." Generally, use of a map-reduce framework involves partitioning an input dataset into multiple shards, using a separate "map" process to apply a user-defined algorithm to each shard, and then using one or more "reduce" processes to consolidate the results generated by all of the map processes across all of the shards of the dataset. Generally, a map-reduce framework enables certain steps of a procedure (e.g., those performed by map processes) to be performed in parallel, thus allowing the procedure to be performed on significantly larger datasets than those which computers deployed differently can handle, and increasing the likelihood of recovering from partial failure during execution. In some embodiments of the invention, a dataset reflecting relationships between users of a social networking service may be partitioned into discrete shards, one or more power iteration algorithms may be applied by a map process to each shard, and one or more reduce processes may consolidate the results generated to determine the user(s) who are influential within the overall community. For example, some embodiments of the invention may involve calculating an influence score or other numeric representation of each user's influence within the community.

The foregoing is a non-limiting summary of the invention, some embodiments of which are defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
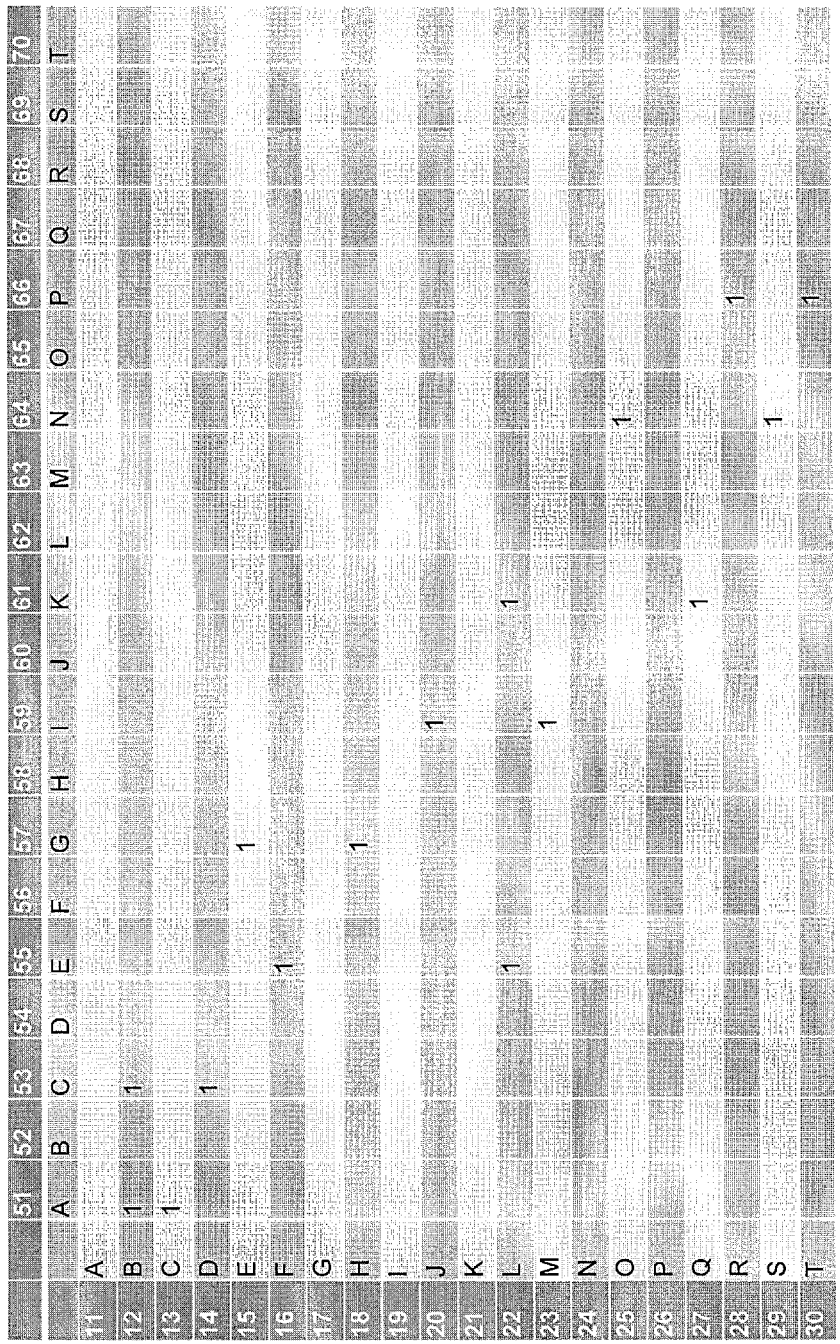
FIG. 1 is a matrix depicting relationships between users of a social networking service, in accordance with some embodiments of the invention.

Some embodiments of the invention provide techniques for identifying influential users of a social networking service. To illustrate the techniques described herein, an example population of users of the Twitter social networking service, and the relationships between certain of those users, is shown in FIG. 1. However, it should be appreciated that embodiments of the invention are not limited to being used in relation to the Twitter social networking service, or to any particular social networking service. Embodiments of the invention may be employed and implemented in any of numerous ways.

FIG. 1 depicts an example two-dimensional matrix 100 which includes data reflecting relationships between twenty users, labeled A through T. Each of users A-T is represented in one row. Thus, user A is represented in row 11, user B is represented in row 12, user C is represented in row 13, and so on. Each user is also represented in one column. Thus, user A is represented in column 51, user B is represented in column 52, user C is represented in column 53, and so on. A cell which resides at the intersection of a row representing one user and a column representing another user may include data indicating the existence of a relationship between those users. In particular, certain cells in example matrix 100 include data (in the depicted example, a "1," although any data may alternatively be used) indicating that the user reflected in the respective column has "re-tweeted" a message sent by the user reflected in the row. Thus, in example matrix 100, the data in the cell at the intersection of row 12 and column 51 indicates that user A (reflected in column 51) has re-tweeted a message sent by user B (reflected in row 12). Similarly, data in the cell at the intersection of row 13 and column 51 indicates that user A has re-tweeted a message sent by user C (reflected in row 13). Data in the cell at the intersection of row 12 and column 53 indicates that user C (reflected in column 53) has re-tweeted a message sent by user B (reflected in row 12). Data in other cells of example matrix 100 reflect re-tweets by other users represented in respective columns of messages sent by users reflected in respective rows.

It should be appreciated that although FIG. 1 depicts an example reflecting relationships between users of the Twitter social networking service, embodiments of the invention are not limited to examining relationships between users of the Twitter service, or to examining any particular type of relationship between users, or to examining any particular quantity of users. For example, a matrix that is constructed in accordance with embodiments of the invention to examine relationships between users of a social networking service may include data indicating that certain users of the Facebook social networking service have "friended" certain other users, that certain users of the Facebook service have "liked," commented upon, and/or "reshared" ideas posted by certain other users, that certain users of the Twitter social networking service "follow" (i.e., receive tweets from) certain other users, etc. Any suitable form(s) of relationship(s) may be reflected, among any suitable quantity of users, of any one or more social networking services, as embodiments of the invention are not limited in this respect.

In general, each user represented in example matrix 100 may be thought of as a node, and an indicated relationship as an edge or link between the nodes. The links reflected in example matrix 100 are depicted conceptually in FIG. 2. Specifically, in FIG. 2, arrows 205 and 210, respectively, indicate that user A has re-tweeted messages by users B and C. Arrows 215 and 220, respectively, indicate that user C has re-tweeted messages by users B and D. Arrows 225 and 230, respectively, indicate that user E has re-tweeted messages by users F and L. Arrows 235 and 240, respectively, indicate that user G has re-tweeted messages by users E and H. Arrows 245 and 250, respectively, indicate that user I has re-tweeted messages sent by users J and M. Arrows 255 and 260, respectively, indicate that user K has re-tweeted messages sent by users L and Q. Arrows 265 and 270, respectively, indicate that user N has re-tweeted messages sent by users O and S. Arrows 275 and 280, respectively, indicate that user P has re-tweeted messages sent by users T and R.

In some embodiments of the invention, a power iteration algorithm may be used to score individual users within a community (e.g., those depicted in FIGS. 1 and 2), and then users may be ranked according to score, so as to identify the most influential users within the community. In an example implementation in which a Twitter user having his/her messages re-tweeted is indicative of influence within the overall community, an example power iteration algorithm is given by:

$$R(t_i) = \frac{d}{N} + (1-d) \sum_{t_j \in Retweet(t_i)} \frac{R(t_j) w(t_j, t_i)}{|Retweeted(t_j)|}$$

In this example, $R(t_i)$ is an influence score assigned to Twitter user $t_i$, N is the number of users in the community, d is a damping factor, $Retweet(t_i)$ represents a number of users that have re-tweeted messages sent by user $t_i$, $Retweeted(t_j)$ represents a number of users whose messages user $t_j$ has retweeted, and $w(t_j, t_i)$ represents a weight of an edge between users $t_j$ and $t_i$ equal to an influence score contribution from $t_j$ to $t_i$. In other example modes of implementation, the example power iteration algorithm given above may be modified based on user and/or relationship characteristics to be analyzed. For example, rather than analyzing relationships based on one user's having re-tweeted a message from another user, a power iteration algorithm employed by some embodiments of the invention may analyze one user's having taken any of numerous actions which may be considered reaffirming another user's message, and/or having taken any of numerous other actions in relation to another user's communication. Embodiments of the invention are not limited in this respect.

Figure 2:
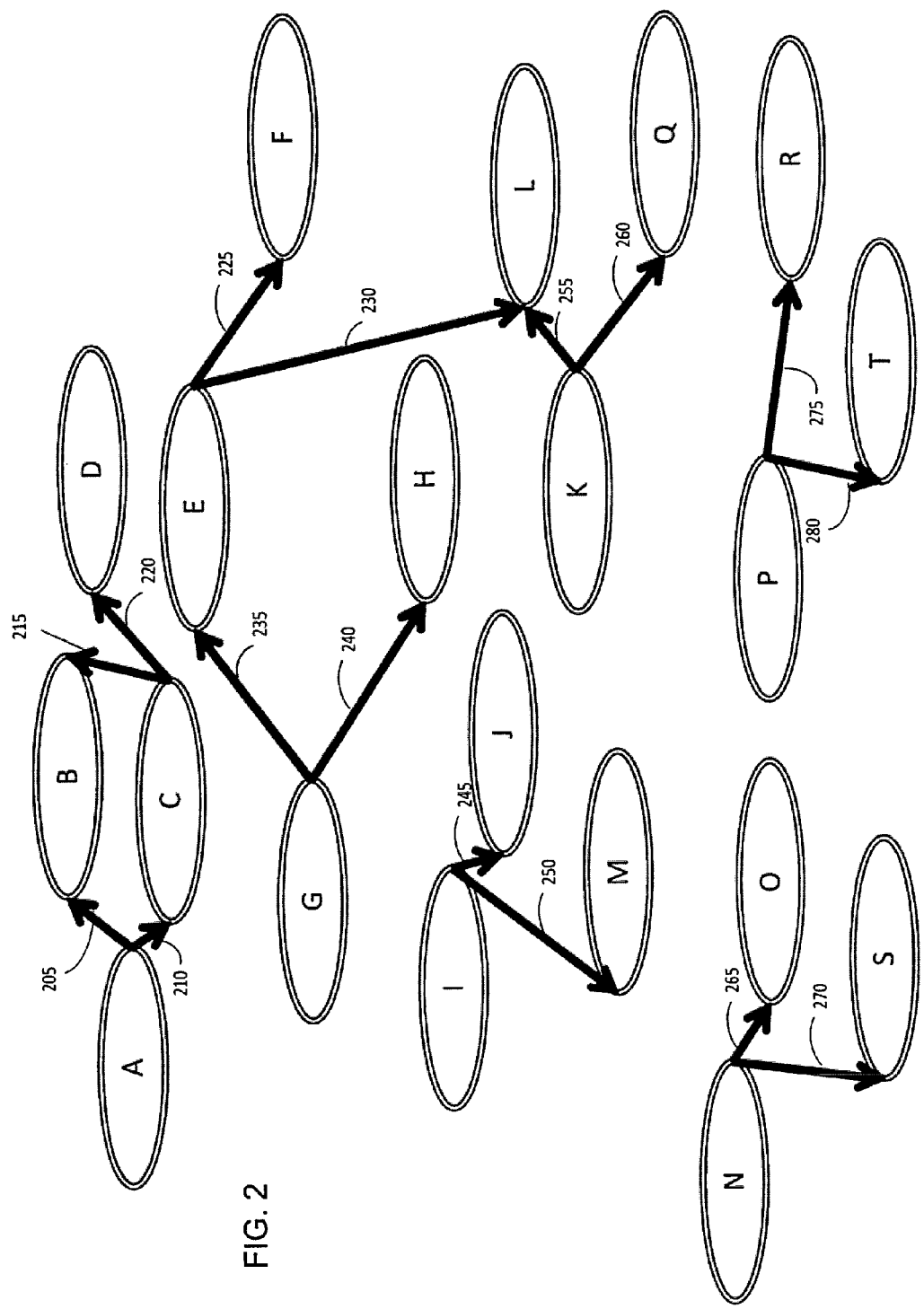
FIG. 2 is a diagram depicting relationships between users of a social networking service, in accordance with some embodiments of the invention.
Figure 3:
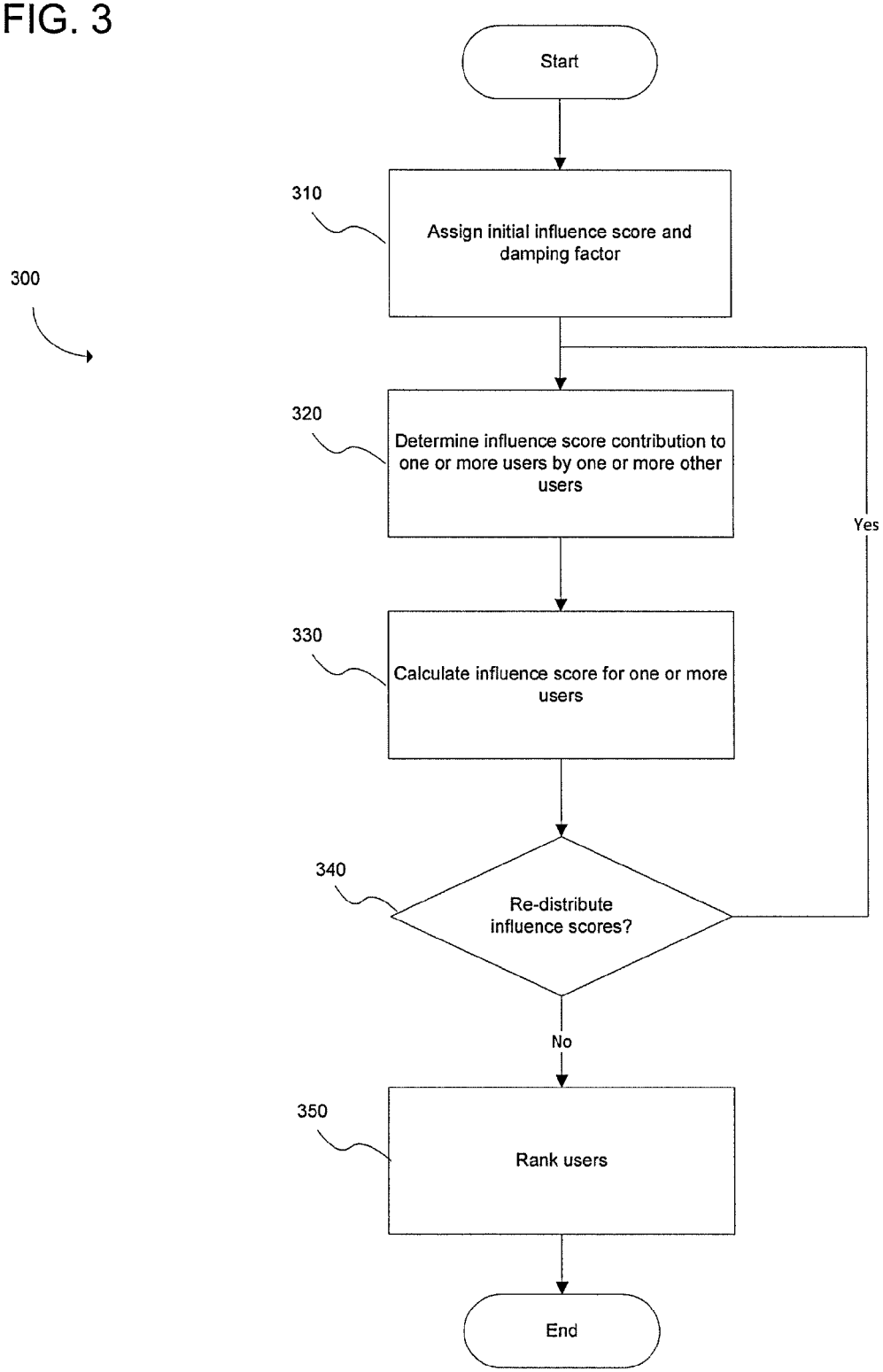
FIG. 3 is a flowchart depicting an example technique for identifying influential users of a social networking service, in accordance with some embodiments of the invention.

FIG. 3 depicts an example process 300 for applying the example algorithm above to the example community of users represented in FIG. 2. At the start of process 300, an initial "influence score" is assigned to each user in the community in act 310. This may be performed in any of numerous ways. In some embodiments of the invention which employ a map-reduce framework, one or more map processes may be performed to assign an initial influence score to each of a group of users represented in a shard.

Figure 4:
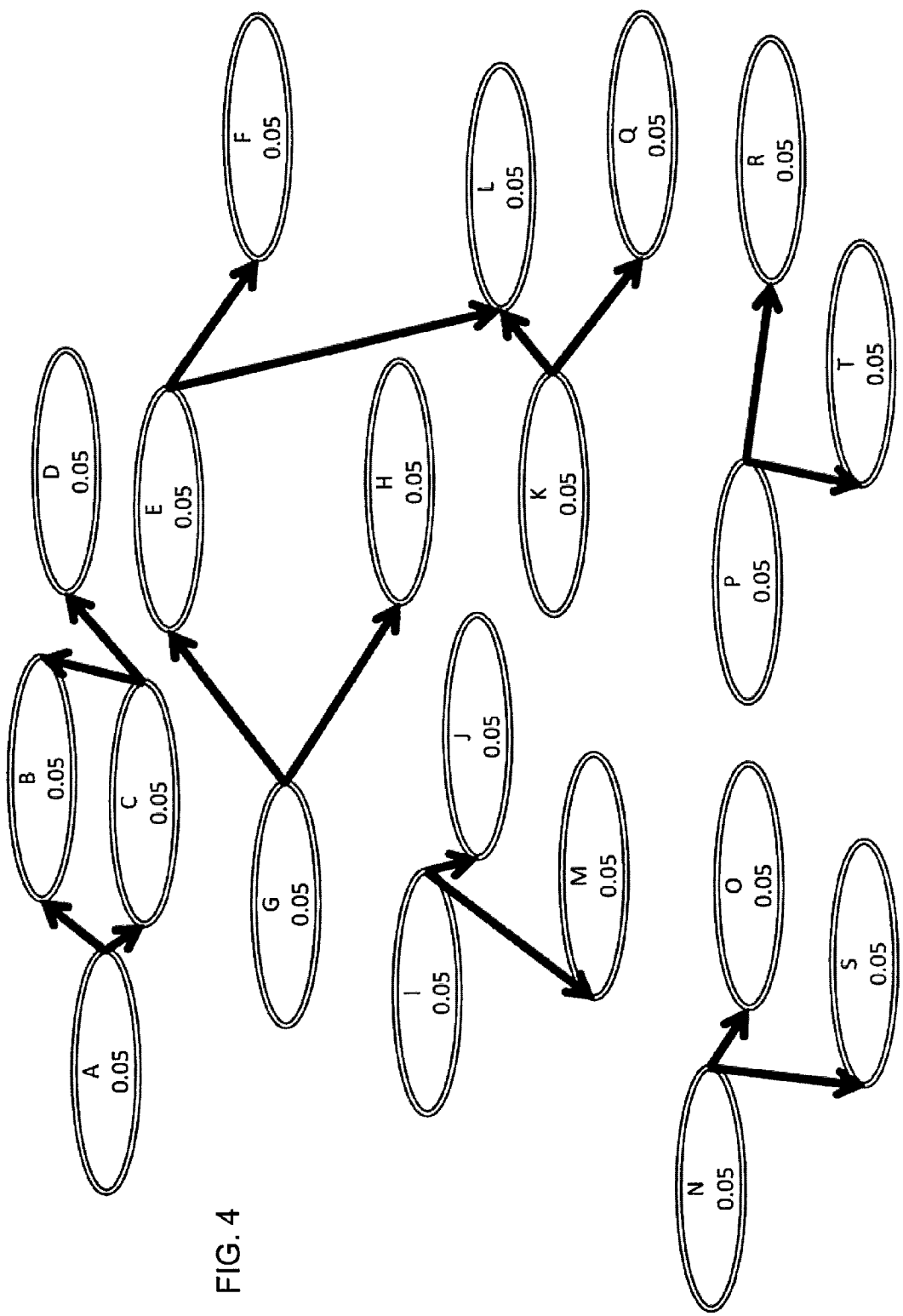
FIG. 4 is a diagram depicting results of an initial example scoring of users of a social networking service, in accordance with some embodiments of the invention.

Any suitable initial influence score may be assigned to each member of the community. In some embodiments of the invention, each user receives an equivalent initial influence score, equal to the inverse of the number of users in the community, although embodiments of the invention are not limited to such an implementation. In the example community of twenty users shown in FIGS. 1-2, each user receives an equivalent initial influence score of one-twentieth, or 0.05. FIG. 4 depicts the example community after this initial influence score is assigned.

Act 310 also includes the assignment of a damping factor d. Any suitable damping factor may be assigned, as embodiments of the invention are not limited in this respect. In the example shown, a damping factor of 0.15 is assigned to the community, and each user receives an equivalent portion (i.e., one-twentieth) of the damping factor. As such, each user in the community is assigned a damping factor of 0.0075. In this example process, each user's portion of the damping factor defines the weight of an edge between users.

Example process 300 then proceeds to act 320, wherein an influence score contribution to each user from one or more other users is determined. This may be performed in any of numerous ways. In embodiments of the invention which employ a map-reduce framework, one or more map processes may calculate contributions to a particular user from one or more other users within a discrete shard of the population.

In some embodiments of the invention, a user receives an influence score contribution from other members of the community who have re-tweeted any of the user's messages. Using FIG. 2 to illustrate, it can be seen (from arrows 205 and 215, respectively) that messages sent by user B have been re-tweeted by users A and C. As a result, user B receives an influence score contribution from each of users A and C, since the re-tweets are indicative of user B's influence in the community. However, since users A and C each re-tweeted the messages of two users (i.e., user A re-tweeted messages sent by users B and C, and user C re-tweeted messages sent by users B and D), the contribution by each user to user B's influence score is split between user B and another user. Specifically, the influence score contribution from user A to user B is split by user B with user C, and the influence score contribution from user C to user B is split by user B with user D. In the example algorithm above, a potential contribution is equal to the contributing user's initial influence score (i.e., 0.05). As a result, user B receives a contribution of half of the initial influence score (i.e., 0.025) of each of users A and C, since B splits their contribution with other users (i.e., users C and D, respectively).

Applying the same logic, user C receives an influence score contribution from user A, but splits that contribution with user B. User D receives an influence score contribution from user C, and does not split that contribution with any other user. Influence score contributions are determined for other users as shown in FIG. 2.

Example process 300 then proceeds to act 330, wherein these contributions are used in calculating an influence score for each user in the community, through application of the power iteration algorithm given above. In embodiments of the invention which employ a map-reduce framework, one or more map processes may perform any or all of act 330 on a discrete shard of the overall user population.

Figure 5:
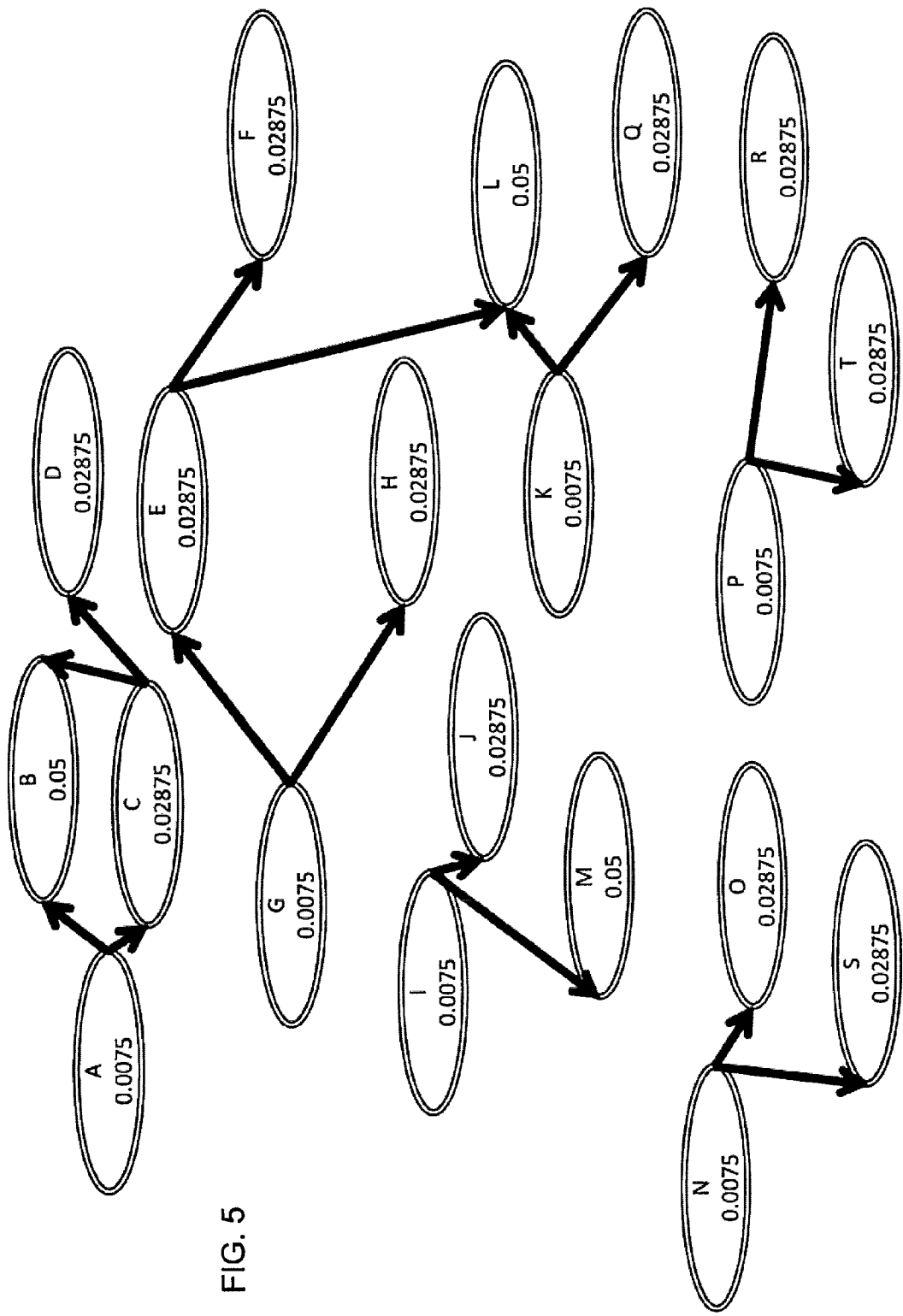
FIG. 5 is a diagram depicting results of a first example distribution of scores among users of a social networking service, in accordance with some embodiments of the invention.

FIG. 5 depicts the results of an influence score calculation for each user in the example community shown. Specifically, given a damping factor d equal to 0.15 and a number of users N equal to twenty, it can be seen that d/N is equal to 0.0075, and that (1−d) is equal to 0.85. For user B, given the potential contribution of 0.05 from each of users A and C, which user B splits with other users, it can be seen that the influence score is equal to 0.0075+0.85*(0.05*2÷2), or 0.05. For user C, given a potential contribution of 0.05 from user A, which user C splits with another user, it can be seen that the influence score is equal to 0.0075+0.85*(0.05÷2), or 0.02875. For user A, given no contribution from another user, the influence score is equal to 0.0075+0.85*0, or 0.0075. For user D, given a potential contribution of 0.05 from user C, which user D splits with another user, the influence score is equal to 0.0075+0.85*(0.05÷2), or 0.02875. FIG. 5 shows influence scores calculated for each user in the community.

Example process 300 then proceeds to act 340, wherein a determination is made whether an additional distribution of influence scores is to be performed. This determination may be made in any of numerous ways, based on any one or more factors. In this respect, one common characteristic of power iteration techniques is the performance of multiple distributions to differentiate members of a population with respect to an observed characteristic (in this example, an influence score). While the number of distributions to be performed may depend on various factors, and may not be known at the outset of the process, in some implementations distribution continues until scores for the members of the population remain relatively stable from distribution to distribution. Thus, a determination whether to perform an additional (e.g., second, third, etc.) distribution may depend on how each user's score changed from before the prior distribution to after it. If the change in at least one user's score is significant enough, then an additional distribution may be performed.

If it is determined that an additional distribution is to be performed, then example process 300 returns to act 320, and continues as described above. In this example, it is determined that an additional distribution is to be performed, resulting in the influence score for each user shown in FIG. 6.

In this distribution, the contribution $w(t_j, t_i)$ from a re-tweeting user to the user whose message was re-tweeted is defined by the re-tweeting user's influence score at the end of the previous distribution (e.g., as shown in FIG. 5). Thus, in a second distribution, the contribution to user B from users A and C is defined by user A's influence score of 0.0075 after the first distribution, and user C's influence score of 0.02875 after the first distribution. Based on split contributions from each of users A and C, user B's influence score after the second distribution is equal to 0.0075+0.85*(0.0075÷2+0.02875÷2), or 0.0229. Based on a contribution from user A only, user C's influence score after the second distribution is equal to 0.0075+0.85*(0.0075÷2), or 0.0107. The influence scores of other users in the community after the second distribution are shown in FIG. 6.

Example process 300 again returns to act 340, wherein a determination is made whether to perform an additional distribution. In this example, a determination is made that, because the influence scores for many users changed significantly from the first to the second distribution, an additional distribution is to be performed, resulting in the influence score for each user shown in FIG. 7.

Figure 6:
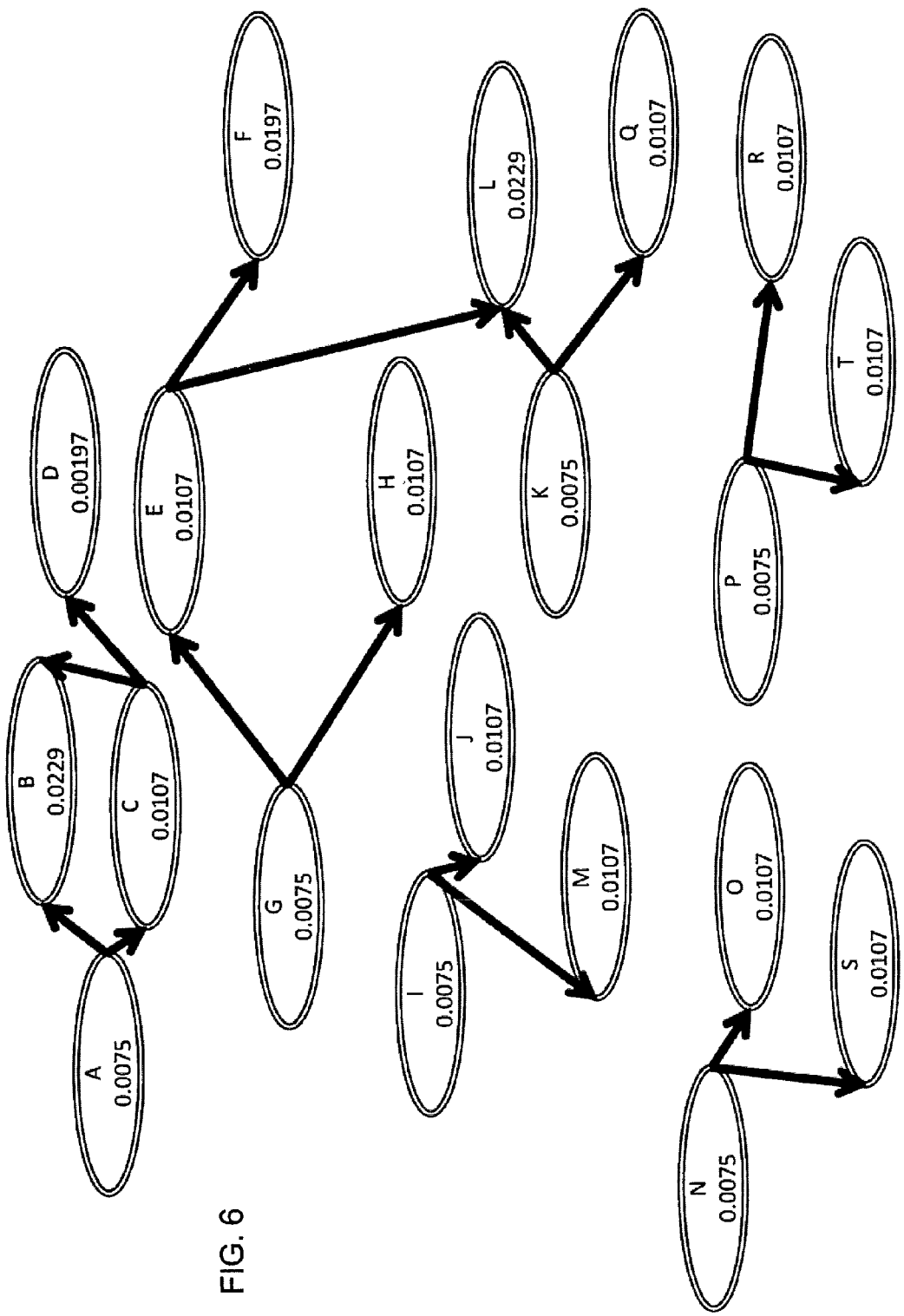
FIG. 6 is a diagram depicting results of a second example distribution of scores among users of a social networking service, in accordance with some embodiments of the invention.
Figure 7:
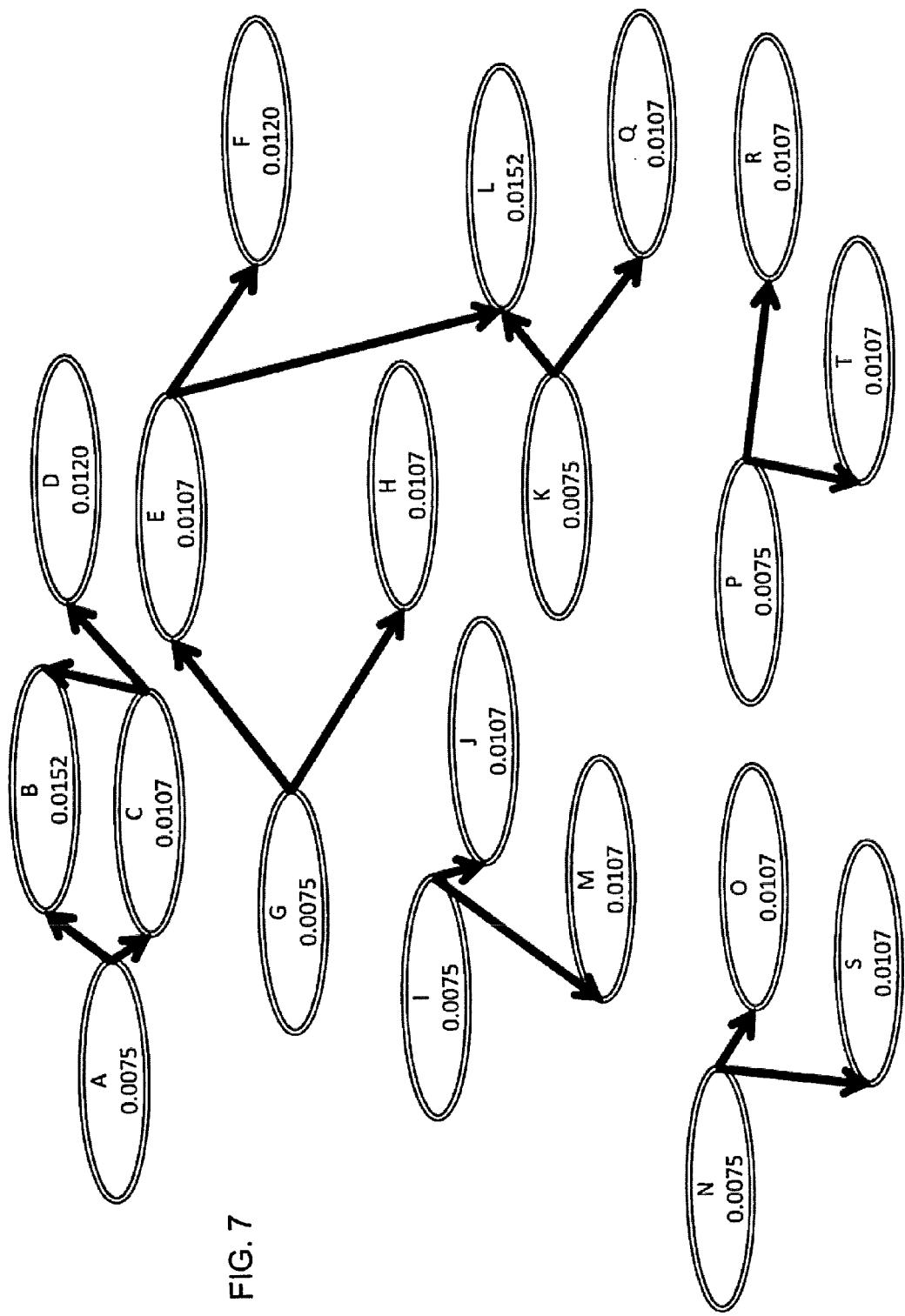
FIG. 7 is a diagram depicting results of a third example distribution of scores among users of a social networking service, in accordance with some embodiments of the invention.

As in the second distribution, a contribution in the third distribution from a re-tweeting user to the user whose message was re-tweeted is defined by the re-tweeting user's influence score at the end of the previous distribution (i.e., as shown in FIG. 6). Thus, the contribution to user B from users A and C is defined by user A's influence score of 0.0075 after the second distribution and user C's influence score of 0.0107 after the second distribution. As a result, after the third distribution, user B's influence score is equal to 0.0075+0.85*(0.0075÷2+0.0107÷2), or 0.0152. Based on a contribution from user A only, user C's influence score after the third distribution is equal to 0.0075+0.85*(0.0075÷2), or 0.0107. The influence scores of other users in the community after the third distribution are shown in FIG. 7.

Example process 300 again returns to act 340, wherein a determination is made whether to perform an additional distribution. It can be seen by comparing FIGS. 6 and 7 that the influence scores for many users in the community remained unchanged from the second distribution to the third distribution. As a result, in this example, it is determined that no additional distribution is to be performed. Example process 300 then proceeds to act 350.

In act 350, users in the community are ranked according to influence score. In this example, after the third distribution, it can be seen that users B and L have been assigned the highest influence score (i.e., 0.0152), followed by users D and F (i.e., 0.0120), then by users C, E, H, J, M, Q, O, R, S and T (i.e., 0.0107). Users A, G, K, N and P have been assigned the lowest influence score (i.e., 0.0075). Thus, users A, G, K, N and P may be identified the least influential within the community. By contrast, users B and L may be identified as the most influential within the community.

At the completion of act 350, process 300 completes.

It should be apparent from the description above that the disclosed process represents merely one example implementation of a technique for identifying influential users of a social networking service. Any of numerous variations on this technique are possible. For example, although the process described above relates to users of the Twitter social networking service, embodiments of the invention may be applied to users of any one or more social networking services. In addition, although the process described above employs a user's having had his/her messages re-tweeted as an indication of the user's influence, any one or more other indications may alternatively be employed. Some other example indications include a quantity of users of the Twitter social networking service that "follow" a given user, a quantity of users of the Facebook social networking service that have "friended" a given user, a quantity of users of the Facebook service have "liked," commented upon, and/or "reshared" ideas posted by a given user, any combination of these indications, and/or any other indication(s). Embodiments of the invention are not limited to any particular manner of implementation.

It should also be appreciated that numerous variations on the power iteration algorithm given above are possible. As but one example, the algorithm given above could be modified to account for a number of users to which a user's message is re-tweeted, since this may indicate a user's potential audience "reach." To illustrate, consider the user community described above, in which user B receives an initial influence score contribution from each of users A and C. In an example variation on the process described above, if user A had significantly more Twitter followers than user C, then the initial influence score contribution by user A to user B may be larger than the contribution made by user C to user B, since user A's larger number of followers means that user A re-tweeting user B's message results in the message being distributed to a larger audience than user C re-tweeting the message. The respective contributions of users A and C to user B may, for example, depend on (e.g., be proportional to) the number of followers of each. For example, if user A has ten times the number of followers of user C, then user A's contribution to user B may be ten times (or some other suitable multiplier) as large as user C's contribution. Any of numerous modifications to the process described above may be envisioned by those skilled in the computer programming arts.

In some embodiments of the invention, a software framework known as "map-reduce" may be employed to implement an algorithm used to calculate an influence score for each user in a community, and to rank users according to calculated influence score. In these embodiments, an input dataset representing the community of users may be partitioned into a plurality of discrete shards, using any suitable technique. In one example, an input dataset may be partitioned into shards so that each user's communications (e.g., tweets, postings, etc.) are received only by users represented in the same shard. In another example, each shard includes data representing a user and all other members of the community that have repeated the user's communications.

Any suitable technique may be used for partitioning data representing a community of users into multiple discrete shards. In some embodiments of the invention which employ a map-reduce framework, the framework itself may provide built-in partitioning functionality. For example, a Hadoop map-reduce framework may automatically divide an input dataset into a number of portions so that each portion is about the same configurable target size (e.g., 64 MB, or any other suitable size). Alternatively, a Hadoop map-reduce framework may apply a function (user-defined, built-in, or some combination thereof) to a set of input records so as to identify a shard to which each particular input record is to belong. For example, in some embodiments in which input records comprise key-value pairs, a function may be applied to a key portion of each record to generate a hash of the key, and then a modulo of the hashed integer over the number of reduce processes may be computed, with the computed modulo value identifying the shard to which the record is to belong. Any of numerous techniques may be employed to partition records using functionality provided by a map-reduce framework, as embodiments of the invention are not limited in this respect.

Of course, partitioning need not be performed using functionality provided by a map-reduce framework. For example, one or more custom functions may be applied to an input dataset to partition the dataset into shards. For example, a user-defined function may partition a dataset of records on users of a social networking service by clustering the users. For example, each cluster may include data on users which are connected in some respect (e.g., by one user having sent a communication to the other, having "friended" the other, and/or based on any other suitable indicia). Any suitable partitioning technique may be employed, as embodiments of the invention are not limited to any particular manner of implementation.

In accordance with a map-reduce framework, a separate map process may apply an algorithm to the data in each discrete shard to calculate an influence score for each user represented in the shard. Multiple map processes may, for example, be executed in parallel on corresponding shards. For example, in some embodiments, a physical mapper instance may execute one or more map processes, with each processing node (e.g., computer) executing one or more physical mapper instances. In some embodiments, a map-reduce framework may employ a thread pool model, with each map process comprising a mapping "task" which is placed in queue, and mapper instances selecting mapping tasks one by one from the queue until all mapping tasks are completed. Of course, embodiments of the invention need not employ a thread pool model, and may be implemented in any of numerous ways.

As described above, each map process may perform iterative processing (e.g., using a power iteration algorithm) with an influence score for each user in the shard being determined at least in part by contributions from other users, and with each contribution being determined at least in part by the contributor's influence score as of a prior iteration. Of course, embodiments of the invention are not limited to such an implementation, as iterative processing techniques need not be employed, and if an iterative processing technique is used, an influence score for each user in a shard need not be based on other users' contributions, and need not be based on a contributor's influence score as of a prior iteration.

One or more reduce processes may consolidate results generated by map processes across all of the shards of the dataset. For example, one or more reduce processes may rank users according to influence score across all of the shards. Any suitable technique(s) may be employed to consolidate processing results across any portion (e.g., all) of the shards, as embodiments of the invention are not limited to a particular manner of implementation.

Figure 8:
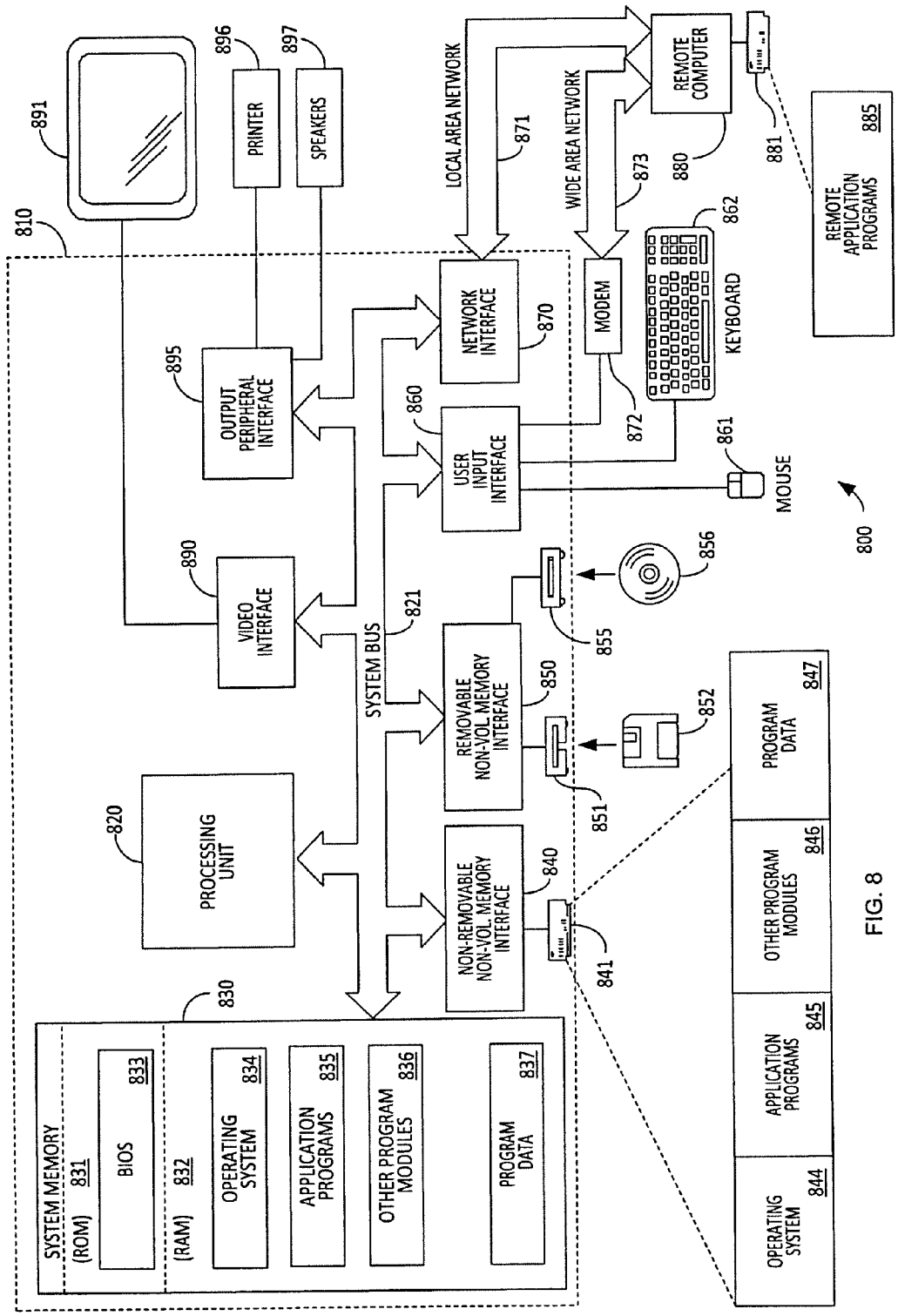
FIG. 8 is a block diagram depicting an example computer which may be used to implement aspects of embodiments of the invention.

FIG. 8 illustrates an example of a suitable computing system environment 800 on which aspects of the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 8, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through a output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method of analyzing a community of social networking service users to identify one or more influential users within the community, the social networking service providing a platform enabling a user within the community to communicate with at least one of a plurality of other users within the community, the method comprising:

by a computing device:
acquiring a dataset representing the community of users;
determining a contribution to a first user within the community by at least one second user of the plurality of other users within the community, the contribution by the at least one second user being defined at least in part by the following: at least a first affirmative step having been taken by the at least one second user with respect to repeating a communication by the first user received by the at least one second user, wherein the communication by the first user is also received by at least another user of the plurality of other users;
calculating an influence score for the first user based at least in part on the following: a total number of users within the community and a number of users of the plurality of other users that have taken at least a second affirmative step with respect to repeating the communication by the first user, the at least first affirmative step being different than the at least second affirmative step; and
revising the dataset based at least in part on the calculated influence score.

2. The method of claim 1, wherein determining the contribution comprises determining a contribution to each of a plurality of first users by a respective at least one second user, and calculating the influence score comprises calculating an influence score for each of the plurality of first users, and the method further comprises:
ranking the plurality of first users based at least in part on the calculated influence score.

3. The method of claim 1, wherein the social networking service is a service comprising social messaging, and the communication by the first user is a tweet.

4. The method of claim 3, wherein the at least first affirmative step is the second user re-tweeting the communication.

5. The method of claim 1, wherein the social networking service is a service comprising personal profiles, and the communication by the first user is a post to the first user's wall or timeline.

6. The method of claim 5, wherein the at least first affirmative step is the second user re-sharing, commenting upon or liking the post.

7. The method of claim 1, wherein determining the contribution and calculating the influence score are performed via application of a power iteration algorithm.

8. The method of claim 7, wherein the power iteration algorithm is given by:

$$R(t_i) = \frac{d}{N} + (1-d) \sum_{t_j \in \text{Reaffirm}(t_i)} \frac{R(t_j) w(t_j, t_i)}{|\text{Reaffirmed}(t_j)|}$$

wherein $R(t_i)$ is an influence score assigned to first user $t_i$, N is a number of users in the community, d is a damping factor, Reaffirm($t_i$) represents a number of second users that have reaffirmed the communication by the first user, Reaffirmed($t_j$) represents a number of users whose messages a second user $t_j$ has reaffirmed, and $w(t_j, t_i)$ represents a weight of an edge between users $t_j$ and $t_i$ equal to an influence score contribution from user $t_j$ to user $t_i$.

9. At least one computer-readable memory having instructions encoded thereon which, when executed, perform a method of analyzing a community of social networking service users to identify one or more influential users within the community, the social networking service providing a platform enabling a user within the community to communicate with at least one of a plurality of other users within the community, the community comprising a first user and at least one second user of the plurality of other users, the first user having been assigned an initial influence score, the method comprising:

determining a contribution to the first user by the at least one second user, the contribution by the at least one second user of the plurality of other users being defined at least in part by at least a first affirmative step having been taken by the at least one second user with respect to repeating a communication by the first user received by the at least one second user, wherein the communication by the first user is also received by at least another user of the plurality of other users;

calculating an influence score for the first user based at least in part on a total number of users within the community and a number of users of the plurality of other users that have taken at least a second affirmative step with respect to repeating the communication by the first user, the at least first affirmative step being different than the at least second affirmative step; and determining, based at least in part on a difference between the initial influence score for the first user and the influence score for the first user, whether the influence score for the first user is to be re-calculated.

10. The at least one computer-readable memory of claim 9, further comprising:

if it is determined that the influence score is to be re-calculated, calculating a second influence score for the first user; and determining, based at least in part on a difference between the influence score and the second influence score, whether the influence score for the first user is to be calculated again.

11. The at least one computer-readable memory of claim 9, wherein the community comprises a plurality of first users, determining the contribution comprises determining a contribution to each of the plurality of first users by a respective at least one second user, calculating the influence score for the first user comprises calculating an influence score for each of the plurality of first users, and the method further comprises:

if it is determined that the influence score is not to be re-calculated, ranking the plurality of first users based at least in part on the calculated influence score for the first user, and updating a dataset with the social networking service users based on the ranking.

12. The at least one computer-readable memory of claim 9, wherein the social networking service is a service comprising social messaging, and the communication by the first user is a tweet.

13. The at least one computer-readable memory of claim 12, wherein the at least first affirmative step is the second user re-tweeting the communication.

14. The at least one computer-readable memory of claim 9, wherein the social networking service is a service comprising personal profiles, and the communication by the first user is a post to the first user's wall or timeline.

15. The at least one computer-readable memory of claim 14, wherein the at least first affirmative step is the second user re-sharing, commenting upon or liking the post.

16. A computer system to analyze a community of social networking service users to identify one or more influential users within the community, the social networking service providing a platform enabling a user within the community to communicate with at least one of a plurality of other users within the community, the computer system comprising:

at least one processor programmed to:

determine a contribution to a first user within the community by at least one second user of the plurality of other users within the community, the contribution by the at least one second user being defined at least in part by at least a first affirmative step having been taken by the at least one second user with respect to repeating a communication by the first user received by the at least one second user, wherein the communication by the first user is also received by at least another user of the plurality of other users; and calculate an influence score for the first user based at least in part on a number of users of the plurality of other users that have taken at least a second affirmative step with respect to repeating the communication by the first user, a number of users of the plurality of other users whose communications the at least one second user has taken at least a third affirmative step to repeat, and a total number of users within the community, the at least first affirmative step being different than the at least second and third affirmative steps.

17. The computer system of claim 16, wherein the at least one processor is programmed to determine a contribution to each of a plurality of first users by a respective at least one second user, calculate an influence score for each of the plurality of first users, and rank the plurality of first users based at least in part on the calculated influence score.

18. The computer system of claim 16, wherein the at least one processor is programmed to determine the contribution and calculate the influence score via application of a power iteration algorithm.

19. The computer system of claim 16, wherein the at least one processor is programmed to:

partition data representing the community of users into a plurality of discrete shards, a first shard of the plurality of shards including data representing the first user and the at least one second user; and determine a contribution to, and calculate an influence score for, a user represented by data in each other of the plurality of shards.

20. The computer system of claim 19, wherein the at least one processor is programmed to rank users across the plurality of shards according to calculated influence score.

* * * * *